United States Patent
Takahashi et al.

[11] Patent Number: 5,799,442
[45] Date of Patent: Sep. 1, 1998

[54] DOOR GLASS WEATHER STRIP

[75] Inventors: Eiichi Takahashi; Mitsuo Hamabata, both of Aichi, Japan

[73] Assignee: Toyoda Gosei Co., Ltd., Aichi, Japan

[21] Appl. No.: 744,580

[22] Filed: Nov. 6, 1996

[30] Foreign Application Priority Data

Nov. 6, 1995 [JP] Japan .................. 7-287073

[51] Int. Cl.$^6$ ........................... E05F 11/38
[52] U.S. Cl. ........................ 49/377; 49/492.1
[58] Field of Search ............. 49/377, 374, 492.1, 49/475.1, 490.1

[56] References Cited

U.S. PATENT DOCUMENTS

| | | | |
|---|---|---|---|
| 5,261,188 | 11/1993 | Vaughan | 49/377 |
| 5,267,415 | 12/1993 | Vaughan | 49/377 |
| 5,353,549 | 10/1994 | Henderson et al. | 49/377 X |
| 5,363,537 | 11/1994 | Schneider et al. | 49/377 X |
| 5,433,038 | 7/1995 | Dupuy | 49/377 |
| 5,519,968 | 5/1996 | Dupuy | 49/377 X |

*Primary Examiner*—Jerry Redman
*Attorney, Agent, or Firm*—Cushman Darby & Cushman Intellectual Property Group of Pillsbury Madison & Sutro LLP

[57] ABSTRACT

A door glass weather strip is structured such that a terminal end portion thereof to be contacted with a door pillar is cut away so as to correspond to the door pillar and is finish end formed. A clip to be inserted into a rectangular engaging hole formed in a door panel is provided on the surface of a mounting portion of the door glass weather strip. That particular, on the surface of the cut-away terminal end portion E of the mounting portion that is opposed to the outside surface of the door panel. The clip is formed of flexible synthetic resin, and includes a first engaging piece portion formed in a hook shape and engageable with the lower edge of the engaging hole in the door panel, and a second engaging piece portion which projects upwardly from the upper end of the first engaging piece portion and also includes in the top portion thereof an engaging stepped portion to be engageable with the upper edge of the engaging hole.

14 Claims, 4 Drawing Sheets

Fig. 1
Fig. 2
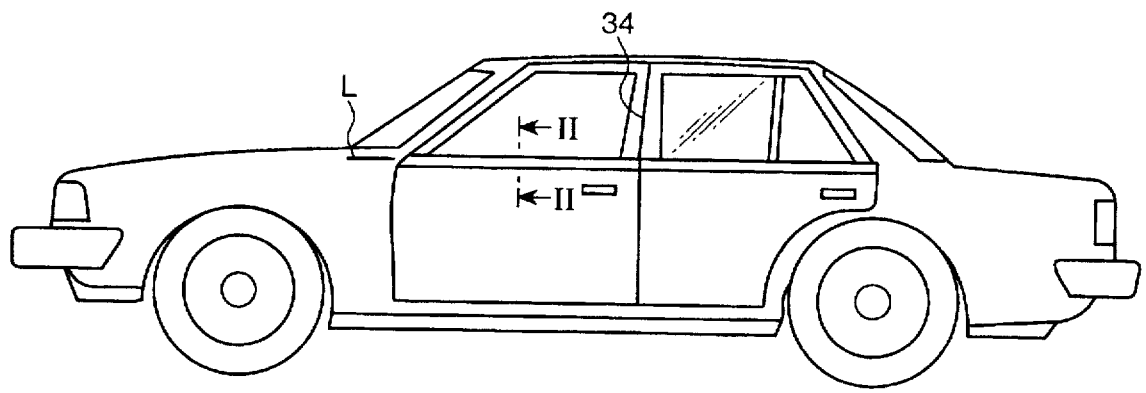
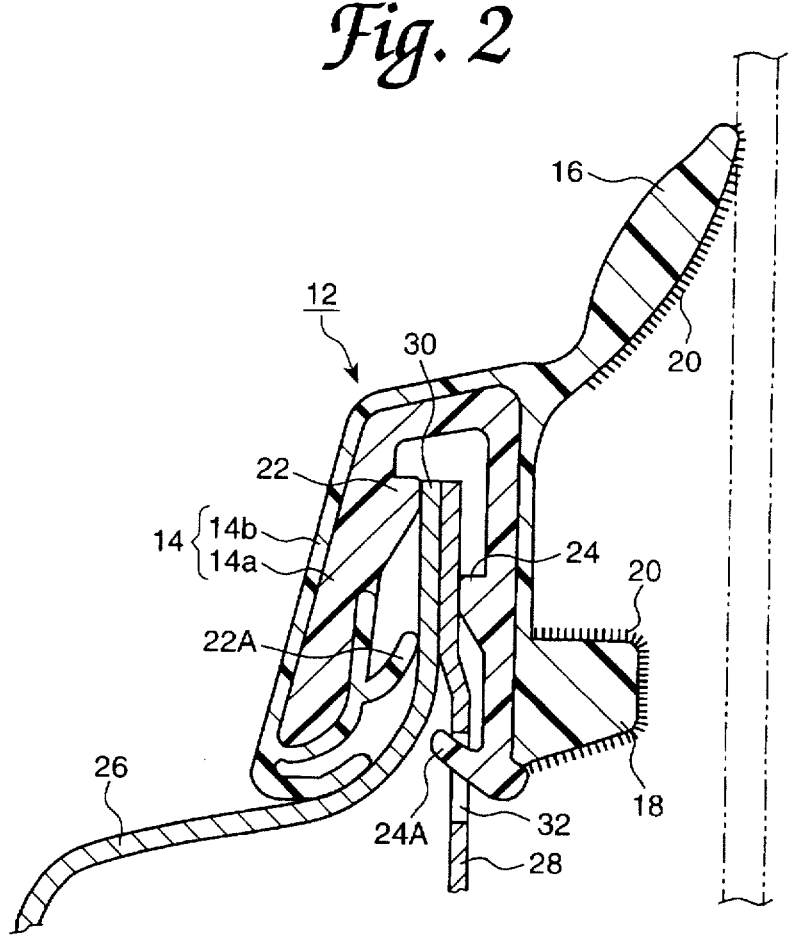

DOOR GLASS WEATHER STRIP

BACKGROUND OF THE INVENTION

1. Field of the Invention

The present invention relates to a door glass weather strip which has a mounting portion arranged mountable onto a door panel at the belt line position of a vehicle door, the mounting portion including seal lips which contact the outer and/or inner surface of a door glass.

The following is a description of a preferred embodiment of a door glass weather strip having a structure including a mounting portion which has an inverted U-shaped section and can be mounted on a mounting flange portion formed by an outer panel and a reinforcing panel. However, the present invention is not limited thereto or thereby. For example, the present invention can also be applied to a door glass weather strip having a structure including a mounting portion which is formed in a belt-like shape and can be mounted onto an outer panel through clips or the like, and can be also mounted onto an inner panel of the door panel.

2. Related Art

A conventional door glass weather strip 12 has a structure as shown in FIG. 2, which is a cross section taken along a line II—II in FIG. 1.

The conventional door glass weather strip 12 includes a trim portion (mounting portion) 14 having an inverted U-shaped section, and first and second seal lips 16 and 18 which project toward the inner side of a vehicle, respectively, from the top portion of the inverted U-shape of the trim portion 14 and from the outside surface of the trim portion 14. The trim portion 14 not only has the inverted Ushaped section but also includes two sets of hold lips 22, 22A and 24, 24A which project obliquely and upwardly toward the center of the trim portion 14 (that is, inwardly thereof) in such a manner that they are opposed to each other. The trim portion 14 is formed in such a manner that an insert 14a is covered with a covering portion 14b by extrusion or by a similar operation. The insert 14a is formed of hard synthetic resin such as hard PVC or the like, while the covering portion 14b is formed of soft synthetic resin such as soft PVC or the like. The first and second seal lips 16 and 18 as well as the outer vehicle side hold lip 22A are respectively formed of the same soft synthetic resin as the covering portion 14b of the trim portion 14. Also, normally, the glass sliding contact surfaces of the first and second seal lips 16 and 18 are respectively coated with sliding treated layers 20 formed of polyurethane coating or flocked piles or the like.

Generally, in order to prevent the trim portion 14 from pulling out from a mounting flange portion 30 which is composed of an outer panel 26 and a reinforcing panel 28, in the reinforcing panel 28 forming part of the flange portion 30, there are formed pulling out preventive holes 32 which are spaced at a given interval from each other and also with which the inner vehicle side hold lips 24A located in the lower stage are engageable in part.

As shown in FIG. 3, the door glass weather strip 12 is structured such that the terminal end side thereof to be contacted with a door pillar (sash) 34 is cut away so as to correspond to the door pillar 34. That is, in the illustrated embodiment, the terminal end portion of the door glass weather strip 12 is cut away from the top portion of the inverted U-shaped section to the inner vehicle side wall. Here, the door pillar 34 is formed of the outer panel 26 and inner panel 36 in a tubular shape and, if the need arises, a reinforcing panel 38 for a pillar is in part overlapped on the outer panel 26 or inner panel 36.

In the cut-away terminal end portion E of the door glass weather strip 12, in particular, in one end thereof, there is provided a screen plate portion 40 which is formed of the same system soft synthetic resin as the covering portion 14b of the trim portion 14 by means of a finish end forming operation. Along the cut-away edge portion of the screen plate portion 40, there is formed a protect/seal covering portion 42.

In the above end forming operation, in order to prevent the terminal end portion from being floated or getting loose, conventionally, a tapping boss 44, including a low hole, is formed integrally with the terminal end portion. After the door glass weather strip 12 is mounted onto the mounting flange portion 30, a tapping screw 46 is screwed into the tapping boss 44 from the side of a screw hole 37 formed in the inner panel 36 through a screw seat, 39 so formed in the outer panel 26 as to project toward the inner vehicle side, so that the terminal end portion is fixed.

However, fixing the terminal end portion by use of a screw takes time, and if the screw is torqued too much, the tapping boss can be damaged thus preventing the screw from securing the terminal end portion properly.

SUMMARY OF THE INVENTION

An object of the present invention is to eliminate the above drawbacks found in conventional door glass weather strips. Accordingly, this an object of the invention is achieved by providing a door glass weather strip in which the terminal end portion of the connecting portion thereof can be fixed to the pillar of a mounting portion with one touch, the need for a screw, which has been conventionally employed to fix the terminal end portion, is eliminated, and any inconvenience due to use of the screw is avoided.

Specifically, the above and other objects can be achieved by provision of a door glass weather strip which, according to the invention, includes a mounting portion mountable onto a door panel at a belt line position of a vehicle door, the mounting portion including seal lips to be in sliding contact with the surface of a door glass, in which a main body of the glass weather strip is arranged such that the terminal end portion thereof to be in contact with a door pillar is cut away so as to correspond to the door pillar, a clip to be inserted into a rectangular engaging hole formed on the outside panel is formed on the surface of the cut-away terminal end portion of the mounting portion that is opposed to the outside surface of the panel, the clip is formed of flexible synthetic resin and includes first and second engaging piece portions, the first engaging piece portion is formed in a hook-like shape and is engageable with a lower edge of the engaging hole of the panel, and the second engaging piece portion includes an engaging stepped portion engageable with an upper edge of the engaging hole of the panel.

The door glass weather strip of the invention provides the following operation and effects due to the above-mentioned structure.

After the first engaging piece portion of the clip is inserted into the engaging hole of the panel until the stopper portion contacts the lower edge of the engaging hole, if the top edge of the mounting portion is pressed against the panel, the top portion of the second engaging piece portion is flexed and thus the second engaging piece portion is allowed to crawl under the upper edge of the engaging hole, so that the engaging stepped portion can be engaged with the back surface of the upper edge of the engaging hole.

Owing to the structure of the invention thus provided, the terminal end portion of the glass weather strip can be fixed to the door pillar with one touch. Also, the clip is now in engagement with the respective back surfaces of the upper and lower edges of the engaging hole of the door panel to thereby prevent the glass weather strip terminal end portion not only from pulling out in the vehicle outside direction but also from rotating in the vehicle outside direction with the lower edge portion of the engaging hole as a fulcrum thereof, to thereby fix the glass weather strip terminal end portion with substantially the same stability as the conventional fixing structure using the screw.

Especially, when the hook-like shape of the first engaging piece portion extends downwardly to thereby provide a guide portion, if the mounting portion is lowered in such a manner that the guide portion slides on the surface of the panel (normally, a slanting surface which spreads out downwardly), then the clip can be guided easily in a direction for insertion of the clip into the engaging hole formed in the panel, which can ease insertion of the clip.

Further, when an energizing lip used to spring energize the mounting portion upwardly is provided in the lower edge of the outer vehicle side wall of the mounting portion, the engaging stepped portion provided in the upper end portion of the second engaging piece portion can be brought into close contact with the upper edge of the engaging hole, which can further enhance the fixing stability of the terminal end portion of the door glass weather strip.

BRIEF DESCRIPTION OF THE INVENTION

FIG. 1 is a side view of a vehicle, showing a portion thereof on which a door glass weather strip is mounted;

FIG. 2 is a sectional view of an example of a conventional glass weather strip, taken along the line 2—2 shown in FIG. 1;

DESCRIPTION OF THE PREFERRED EMBODIMENTS

Figure 3:
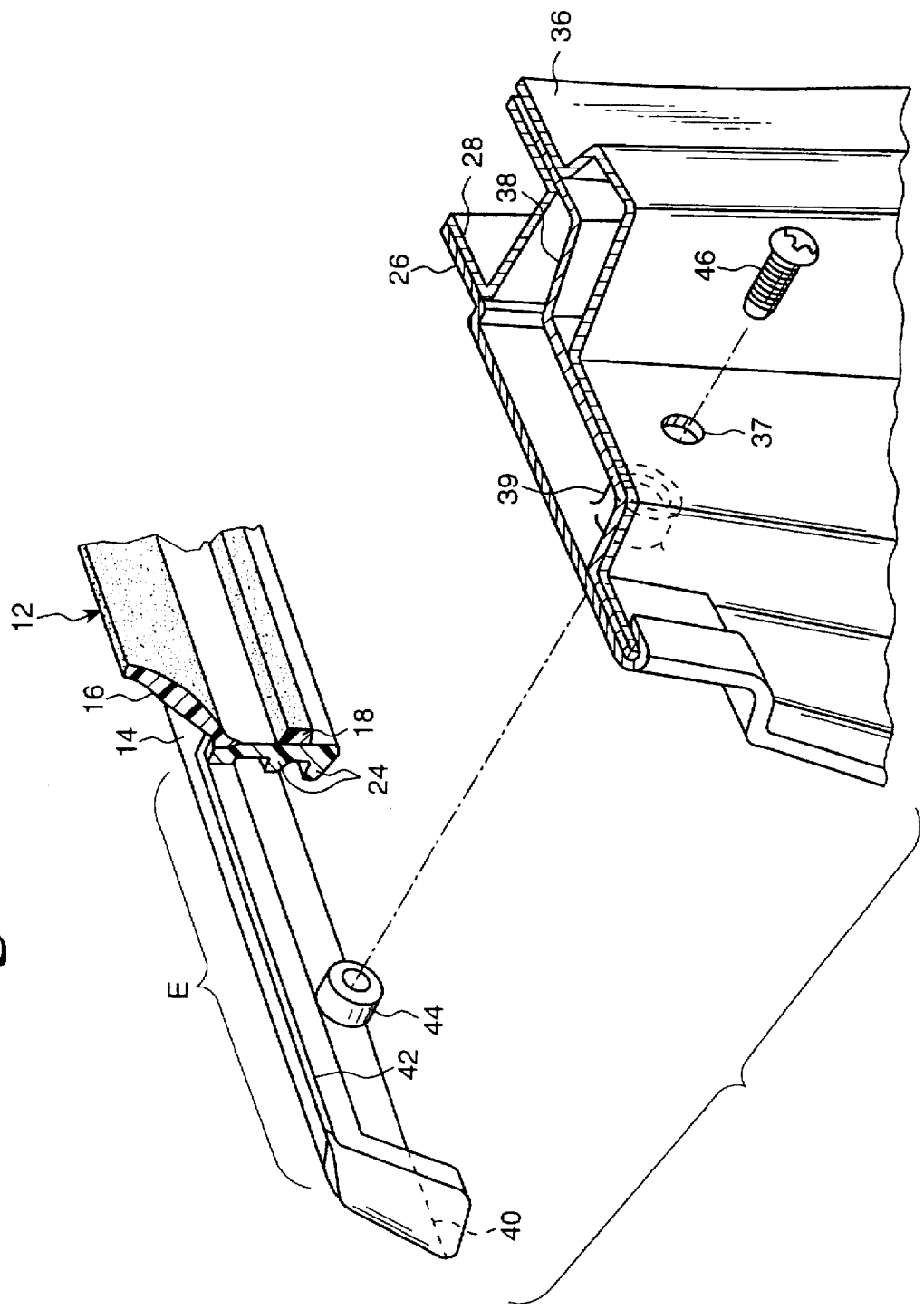
FIG. 3 is a perspective view of the terminal end portion of a conventional glass weather strip corresponding to FIG. 2.

A preferred embodiment of the present invention will now be described in detail with reference to accompanying drawings. In the present embodiment, the same parts as those employed in the above-mentioned conventional door glass weather strip are given the same designations and thus the description thereof is omitted here wholly or in part.

A door glass weather strip 12 according to the present embodiment comprises a mounting portion (trim portion) 14, which can be mounted onto an outer door panel 26 at the belt line L position of a vehicle door, and includes seal lips 16 and 18, respectively, to be slidably contacted by the outer surface of a door glass. The door glass weather strip 12 further includes a terminal end portion E to be in contact with a door pillar 34. The terminal end portion E is cut away so as to correspond to the door pillar 34 and is also finish end formed. Up to this point, the structures of the present embodiment are similar to those of the previously described conventional weather strip, except for the elimination of a tapping boss formed at the terminal end portion of the conventional weather strip.

In the present embodiment, unlike the above-mentioned conventional weather strip, a clip 50, to be inserted into a rectangular engaging hole 48 formed on the outer door panel 26 at the door pillar 34 portion, is formed integrally on the surface of the cut-away terminal end portion E of the mounting portion 14 that is opposed to the outside surface of the door pillar 34.

Referring to this integral formation of the clip 50, the clip 50 may be formed separately and then attached to the glass weather strip terminal end portion E by adhesion, an insert formation, or similar means. It is preferred, however, that the clip 50 be formed integrally with the terminal end portion E when it is formed (injection molded) so that, because the number of the working steps of the terminal end portion E can be reduced.

The clip 50 is formed of the above-mentioned flexible synthetic resin, such as soft synthetic resin, and includes first and second engaging piece portions 52 and 54. Alternative synthetic resin include various kinds of thermoplastic elastomers including a polyolefin system thermoplastic elastomer, a polystyrene type thermoplastic elastomer, a polyester type thermoplastic elastomer, a polyamide type thermoplastic elastomer, and the like.

The first engaging piece portion 52 is formed in a hook shape to be engageable with the lower edge of the engaging hole 48 of the outer door panel 26, while the second engaging piece portion 54 projects upwardly from the upper end of the first engaging piece portion 52 and includes in the top portion thereof an engaging stepped portion 55 to be engageable with the upper edge of the engaging hole 48.

Figure 4:
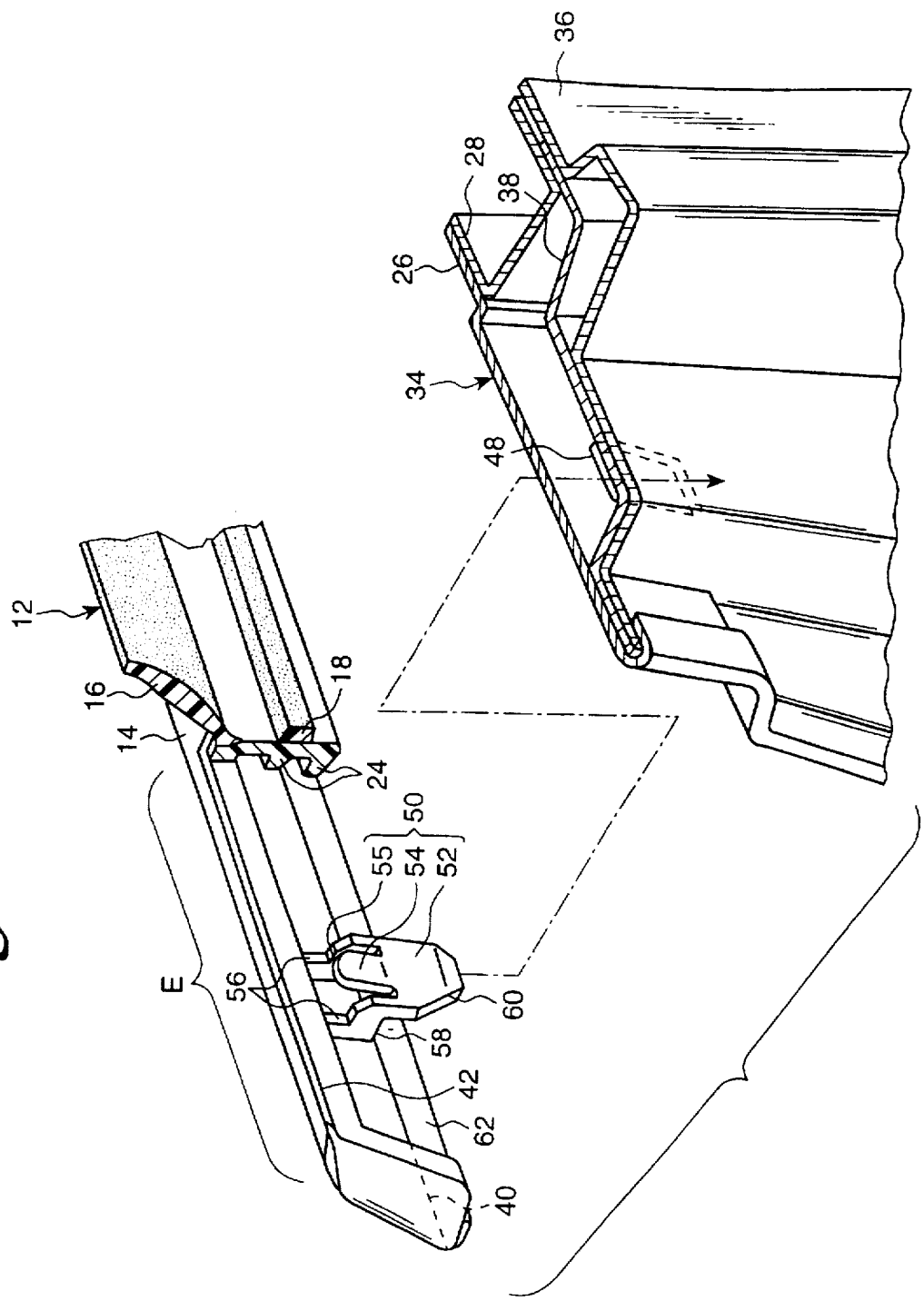
FIG. 4 is a perspective view of the terminal end portion of an embodiment of a glass weather strip according to the present invention corresponding to FIG. 2.
Figure 5:
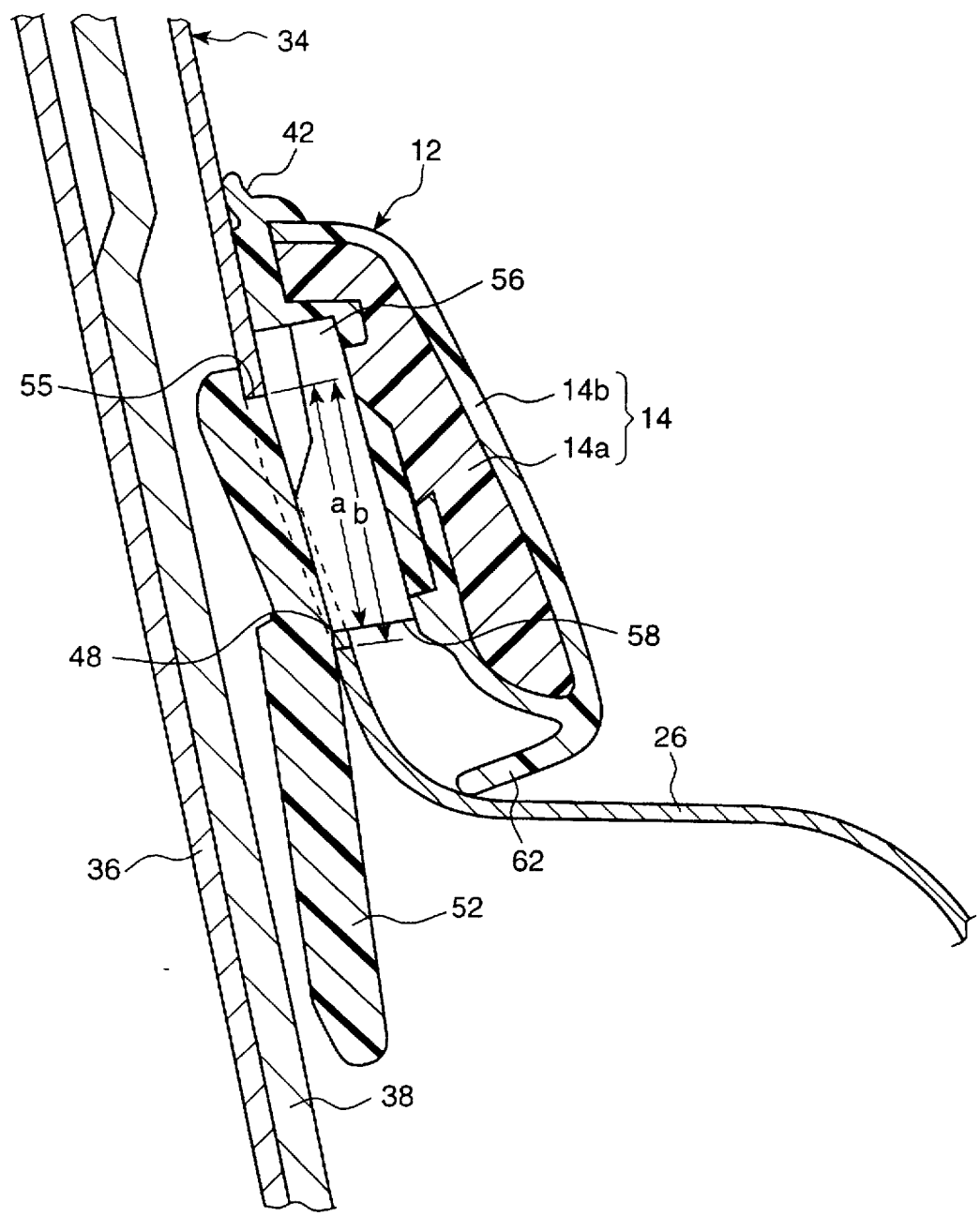
FIG. 5 is a sectional view of the embodiment shown in FIG. 4, taken along the line V—V in FIG. 4.

In this embodiment, the first engaging piece portion 52 is structured so that the base portion that composed of a pair of projecting strips 56 extending downwardly from the top portion of the mounting portion 14 along the wall surface of the mounting portion 14. In the lower end portions of the projecting strips 56, there is formed a stopper portion 58, thereby providing a hook shape. The length of the first engaging piece portion 52 from the stopper portion 58 to the lower end thereof may be set in such a manner that the engaged length thereof with the lower edge of the engaging hole 48 is 5 mm or more. It is desirable that the above-mentioned hook shape extends downwardly to thereby provide a guide portion 60 to assist insertion of the clip 50 into the engaging hole 48. The outside surface of the outer door panel 26 is, as shown in FIG. 4, a slanting surface which spreads out downwardly. Also, the depth and height of the engaging stepped portion 55 formed in the top portion of the second engaging piece portion 52 is preferably set in the range of 0.5–1 mm.

Further, although not necessarily but preferably, an energizing lip 62 used to spring energize the mounting portion 14 upwardly may be formed in the lower edge of the outer vehicle side wall of the mounting portion 14 of the door glass weather strip 12. The energizing lip 62 causes the second engaging piece portion 54 to be positively energized for engagement with the upper edge of the engaging hole 48 to thereby increase the stability of the terminal end portion E of the mounting portion 14 when fixed by the clip 50. This energizing lip 62 serves also as a seal and screen element. Also, referring to the relationship between the distance a from the stopper portion 58 of the first engaging piece portion 52 to the engaging stepped portion 55 of the second engaging piece portion 54 and the longitudinal length b of the engaging hole 48, it may be set on the order of 0<(b−a)<1 mm. This is because an allowance of the order of 1 mm makes it easy to insert and remove the clip 50.

Next, description will be given below of use of the above-mentioned embodiment.

First, the mounting portion 14 of the door glass weather strip 12, while being held by the mounting flange portion 30, is fitted with the mounting flange portion 30. The first engaging piece portion 52 of the clip 50, which is provided in the terminal end portion E of the mounting portion 14, slides on the slanting surface of the outer door panel 26 and is inserted into the engaging hole 48. That is, the mounting portion 14 is pushed down until the stopper portion 58 of the first engaging piece portion 52 of the clip 50 contacts the lower edge of the engaging hole 48 of the outer door panel 26. In this state, if the top portion side of the clip 50 is pressed against the outer door panel 26 side, then the top portion of the second engaging piece portion 54 is flexed to thereby allow the second engaging piece portion 54 to crawl under the upper edge of the engaging hole 48, so that the engaging stepped portion 55 can be engaged with the back surface of the upper edge of the engaging hole 48.

With the clip 50 engaged with the respective back surfaces of the upper and lower edges of the engaging hole 48 the terminal end portion E of the door glass weather strip is prevented not only from pulling out in the vehicle outside direction but also from rotating in the vehicle outside direction with the lower edge portion of the engaging hole 48 as a fulcrum thereof. Thus the terminal end portion E is fixed with substantially the same stability as with the conventional screw fixing method.

Since the engaging stepped portion 55 provided in the upper end portion of the second securing piece portion 54 is in close contact with the upper edge of the engaging hole 48 due to the energizing lip 62, the resultant fixing stability of the terminal end portion of the door glass weather strip is excellent. Further, because there exists a gap between the stopper portion 58 of the first engaging piece portion 52 and the lower edge of the engaging hole 48, if the door glass weather strip 12 is pressed down and pulled toward you, the engaging stepped portion 55 of the second engaging piece portion 54 is easily disengaged from the upper edge of the engaging hole 48. After that, if the door glass weather strip 12 is pulled upwardly, then the door glass weather strip 12 can be removed.

What is claimed is:

1. A door glass weather strip comprising:
   a mounting portion mountable onto a door panel at a belt line position of a vehicle door, the mounting portion comprising first and second seal lips slidably contacting with a respective surface of a door glass;
   a terminal end portion contacting with a door pillar, said terminal end portion having a cut away portion corresponding to the door pillar; and
   a clip member formed of flexible synthetic resin which inserts into an engaging hole formed in the door panel and fixed to said cut-away portion of said terminal end portion at a position opposed to an outside surface of said door panel.

2. The door glass weather strip of claim 1, wherein said clip member comprises:
   a first engaging piece portion formed in a hook shape and engageable with a lower edge of said engaging hole of said door panel; and
   a second engaging piece portion projecting upwardly from an upper end of said first engaging piece portion.

3. The door glass weather strip of claim 2, wherein said first engaging piece portion comprises a stopper portion and said second engaging piece portion comprises an engaging stepped portion to be engaged with an upper edge of said engaging hole.

4. The door glass weather strip of claim 3, wherein a length of said first engaging piece portion from said stopper portion to a lower end thereof is determined in such a manner that an engaged length of the first engaging piece portion with the lower edge of the engaging hole is 5 mm or more.

5. The door glass weather strip of claim 3, wherein a depth and height of the engaging stepped portion are set in a range of 0.5–1 mm.

6. The door glass weather strip of claim 3, wherein a relationship between a distance "a" from said stopper portion of said first engaging piece portion to the engaging stepped portion of said second engaging piece portion and a longitudinal length "b" of said engaging hole satisfies the following formula:

$$0 < (b-a) < 1 \text{ mm}.$$

7. The door glass weather strip of claim 1, wherein said mounting portion comprises an inverted U-shaped section.

8. The door glass weather strip of claim 2, wherein said hook shape of said first engaging piece portion extends downwardly to define a guide portion.

9. The door glass weather strip of claim 1, further comprising an energizing lip for spring energizing said mounting portion upwardly, said energizing lip being disposed on a lower edge of an outer side wall of said mounting portion.

10. The door glass weather strip of claim 1, wherein said clip member is formed integrally with said terminal end portion by an injection molding process.

11. The door glass weather strip of claim 1, wherein said clip member is formed of a PVC material.

12. The door glass weather strip of claim 1, wherein said clip member is formed of thermoplastic elastomers.

13. The door glass weather strip of claim 12, wherein said clip member is formed of a material selected from a group consisting of a polyolefin type thermoplastic elastomer, a polystyrene type thermoplastic elastomer, a polyester type thermoplastic elastomer, and a polyamide type thermoplastic elastomer.

14. The door glass weather strip of claim 1, wherein said engaging hole formed in the door panel is rectangular.

* * * * *